United States Patent [19]

Iwase et al.

[11] Patent Number: 5,316,557
[45] Date of Patent: May 31, 1994

[54] MANUFACTURING PROCESS OF ALKALINE CELL

[75] Inventors: Akira Iwase, Osaka; Hirofumi Iwaki, Katano; Toshikazu Kaneko, Hirakata; Isao Kubo, Kadoma; Koichi Sato, Hirakata, all of Japan

[73] Assignee: Matsushita Electric Industrial Co., Ltd., Kadoma, Japan

[21] Appl. No.: 32,613

[22] Filed: Mar. 17, 1993

[30] Foreign Application Priority Data

Mar. 17, 1992 [JP] Japan ................................ 4-059958

[51] Int. Cl.⁵ .......................................... H01M 10/28
[52] U.S. Cl. .............................. 29/623.5; 29/623.1; 429/206
[58] Field of Search ..................... 29/623.5, 623.1; 429/206

[56] References Cited

U.S. PATENT DOCUMENTS 5,051,321  9/1991  Kitagawa et al. ............... 29/623.5

FOREIGN PATENT DOCUMENTS 83631a    8/1980  Japan .
61-160229 12/1986  Japan .

Primary Examiner—John S. Maples
Attorney, Agent, or Firm—Ratner & Prestia

[57] ABSTRACT

The present invention relates to a process to manufacture alkaline cells by applying electrically conductive paint on an inner wall area of cathode container which contacts with cathode molds, and by heating said cathode container itself by applying electromagnetic induction in order to dry and/or cure the paint and to form a uniform electrically conductive coating layer adhered firmly on the inner wall of said container. By employing this process, continuous production of alkaline cells having excellent and uniform load characteristics which deteriorate very little became possible.

7 Claims, 1 Drawing Sheet

MANUFACTURING PROCESS OF ALKALINE CELL

FIELD OF THE INVENTION

The present invention relates to a process to manufacture alkaline cells such as alkaline-manganese cells wherein zinc is employed as anode active material, metal oxide such as manganese dioxide is employed as cathode active material, and caustic alkaline such as potassium hydroxide is employed as electrolyte in most of the cases.

This invention relates particularly to a process to manufacture an alkaline cell comprised of a cathode container within which a cathode molding body is adhered closely to the cell case by means of a layer of electrically conductive paint which is dried and/or cured by means of electromagnetic induction heating after it is applied.

BACKGROUND OF THE INVENTION

A typical structure and manufacturing process of the alkaline-manganese cell which is most popular and mass produced presently among various types of the alkaline cell are first explained in the following. FIG. 1 shows a vertical cross-section of AA-size LR6 type cell.

A mixture comprised of manganese dioxide powder and graphite powder is molded into a cylindrical hollow pipe, and plural of such molds are stacked in an axially aligned form. After these molds acting as a cathode 1 are inserted into a cell case 4, the cathode is pressed against the inner wall of the cell case 4 which acts as a positive terminal.

Then, a cylinder-shaped separator with a bottom, 3, is inserted into a cylindrical space provided within the cathode 1, and alkaline electrolyte is supplied into the center space of the separator 3 in order to wet the separator 3.

A gel-anode 2 comprised of zinc powder dispersed into alkaline electrolyte of which viscosity is enhanced by means of a viscous agent such as carboxy methyl cellulose, is then supplied into the inner space within the separator 3. After a collector 6 integrated with a bottom plate 5 acting as a negative terminal, insulating washer 7, and a gasket 8, is inserted into the gel-anode 2, the cell case is sealed, and is packaged with a jacket 9.

However, within the alkaline-manganese cell manufactured by the process shown in above, growth of oxide film over the area contacted with the cathode may take place within the cell case, and by this, the electrical resistance between the cell case and the cathode is increased gradually.

Since this increased resistance and thus increased IR loss within the oxide layer invites cell voltage drop and deterioration of discharge characteristics, these should be processed particularly when the cell is operated a heavy load.

In order to solve this problem of increased ohmic resistances between the cathode 1 and the cell-case 4, a method providing plural axially protruded ridges on the inner wall of the cell case 4 at the area contacting with the cathode mold, or, a method such as disclosed by the Japanese Patent Publication Sho 42 (1967)-25145, providing a conductive film 10 on the inner wall had been developed and employed.

The most effective among these methods was found to be a method by which an electrically conductive paint made mainly of graphite and/or carbon black powder is applied and dried in order to form an electrically conductive film on the inner wall of the cell case 4.

FIG. 2 is a partially enlarged view of the cross-sectional area contiguous to the cell case 4 wherein the specified numbers are identical with the corresponding numbers shown in FIG. 1.

Although either one of the conventional methods shown below had been employed in order to dry the before-mentioned conductive paint, problems shown below had been found.

(1) Method to dry at room temperature

This is advantageous since no particular manufacturing equipments are required. However, since at least one day has to be allowed before complete drying of the paint, this process has to be conducted at a dedicated place other than the alkaline cell manufacturing area. Moreover, the wet paint coated on the inner wall of the cell case trailed down very often producing streaks of swelled conductive paint or a conductive film with uneven thickness.

Since these swelled paint streaks may easily be peeled off at the time when the cathode molds are inserted into the cell case, this had been considered as one of the major causes producing uneven load characteristics of the cells. Furthermore, since the thermosetting resin was found improper to be used as the paint binder resin, the types of binder resin had been limited.

(2) Method to dry by hot wind

This is a method by which the cell case painted with conductive paint is placed in a hot wind oven heated at about 100° C. in order to purge the paint solvent or in order to cure the thermosetting resin such as epoxy resin used as a binder of the paint if such paint is used.

However, even with this heating method, it takes a period of one to ten minutes before the coating paint layer is completely dried or cured. Thus, a fairly large batch system or a fairly large manufacturing system formed around a conveyor line provided with a residence time has to be provided for this.

Moreover, in a case where a deep cell case, for example LR6 (AA-size) or LR03 (AAA-size), having a large aspect ratio between the inner diameter and the depth from the flange to the bottom, has to be painted, complete elimination of the paint trailing phenomenon is virtually impossible, so the complete elimination of variation in the load characteristics of the cells.

(3) Method to dry at decompressed atmosphere

This is a batch method using a decompressed chamber instead of hot wind oven. Since boiling of the paint solvent may take place in the decompressed chamber, this may result in poor adhesion of conductive layer onto the cell case. Moreover, the batch system is not advantageous in respect of the productivity.

SUMMARY OF THE INVENTION

The content of a dispersion medium such as a solvent in a conductive paint is restricted within a range from 75 to 85 wt %, and electromagnetic induction heating which may be accompanied by wind blowing is applied to the cell case in order to heat it rapidly and evenly to a temperature ranging from 150° C. to 250° C. in order to prevent the paint trailing phenomenon.

DESCRIPTION OF THE PREFERRED EMBODIMENTS

Figure 1:
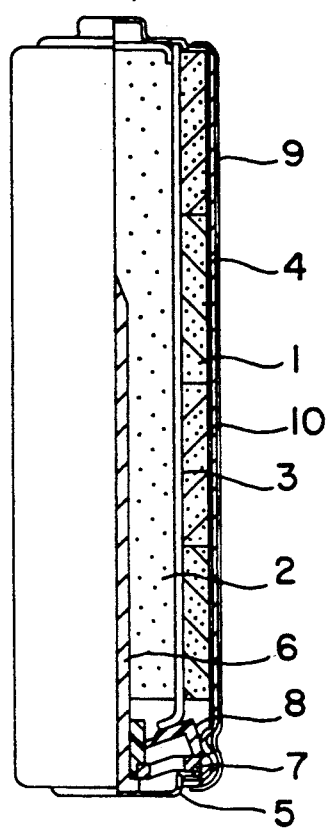
FIG. 1 shows a vertical cross-section of LR6-type alkaline-manganese cell.
Figure 2:
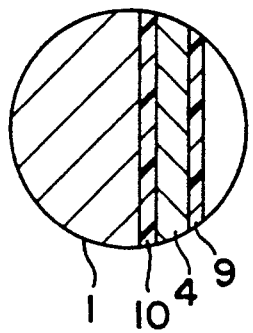
FIG. 2 shows a partially enlarged cross-sectional area contiguous to the cell case of said cell.

A cell case made of steel which is a magnetic material, is heated quickly and evenly by utilizing the magnetic induction current produced therein. The detail of the invention is now explained by referring some of the examples of the invention.

EXAMPLE-1

A mixed organic solvent solution of binder comprised of a vinyl chloride-vinyl acetate copolymer comprised mainly of vinyl chloride which is conventionally called vinyl chloride resin dissolved into a mixture of methyl ethyl ketone MEK and methyl isobutyl ketone (MIBK), is prepared first. Then, mixed conductive powder made of graphite powder and acetylene black is dispersed into said mixed organic solvent solution of binder in order to prepare conductive paint.

In this case, the mixing ratio between the solid component consisted of the conductive material and binder, and the solvent is set at a ratio of 20:80 in weight, or at a solvent content of 80 wt %.

A predetermined amount of the paint is injected through a nozzle in order to apply the paint onto the inner wall of the rotated cell case on which the cathode of the alkaline-manganese cell is to be contacted.

Right after the coating of the paint, electromagnetic induction heating is applied to the cell case in order to form a conductive film therein by raising its temperature up to about 200° C. The surface temperature of 200° C. is attained by setting the applied power of the electromagnetic induction in a range from 20 to 50 watts per cell case. The surface temperature of the cell case is measured by using a T-type copper and copper-nickel alley thermocouple pressed against the center of the cell case.

In order to compare the method of Example-1 with the conventional methods, ten each alkaline-manganese cells are prepared under an identical manufacturing condition by using the cell cases coated with the conductive paint prepared by the method of Example-1, and two conventional methods including the method to dry at room temperature (conventional method-I) and the method to dry by hot wind (conventional method-II).

Table 7 shows respective load characteristics averaged for these ten each cells measured right after the preparation and after the one-month storage period at 60° C.

The load characteristics are shown in terms of the means of the short circuit current, x, measured by using a moving coil ammeter and the variation thereof between the maximum and the minimum is expressed by S.

TABLE 1

| Type of method | Heating method | Drying period | Short circuit current (in amp.) Right after preparation | After storage period |
|---|---|---|---|---|
| Invented method | Electro-magnetic induction | 10 sec. | x = 10.2 S = 0.68 | x = 7.5 S = 0.48 |
| Conventional | Storage in room | One day | x = 10.0 S = 0.86 | x = 7.5 S = 0.70 |

TABLE 1-continued

| Type of method | Heating method | Drying period | Short circuit current (in amp.) Right after preparation | After storage period |
|---|---|---|---|---|
| method-I Conventional method-II | temperature Hot wind | One minute | x = 10.2 S = 0.89 | x = 7.6 S = 0.68 |

As shown in Table 1, although no significant differences between the averaged values of short circuit current of the cells measured right after and after the one-month storage period at 60° C. are seen there, the magnitude of variation thereof is minimum for the cells prepared by the method of the invention. This can be attributed for the more uniform approximately 5 μm-thick conductive film formed by rapid and uniform electromagnetic induction heating.

Since the drying process using electromagnetic induction heating can be accomplished within a short period, this process can be incorporated within a continuous production line or within a conveyor line. If a hot wind drying method is added to the electromagnetic induction method in this case, the evaporated solvent can be recovered into a recuperator efficiently, the environment and safety can be highly improved yielding a higher industrial value.

EXAMPLE-2

The paint coated on the cell case is dried at various surface temperatures in a range from 70° C. to 300° C. while it is maintained for ten seconds by adjusting the power of electromagnetic induction, and the dryness of the coatings are observed.

By using the cell cases on which thus dried coatings are formed, alkaline-manganese cells are fabricated, and the load characteristics (short circuit current) are measured right after and after one-month storage period at 60° C. as in the case of Example-1, and the results of these measurements are tabulated in Table 2.

TABLE 2

| Cell type | Surface temperature of cell case (in °C.) | Dryness of solvent in the paint (in %) | Mean short circuit after one-month 60° C. storage (in amp) |
|---|---|---|---|
| A | 70 | 92 | 7.7 |
| B | 150 | 100 | 7.8 |
| C | 200 | 100 | 7.5 |
| D | 250 | 100 | 7.3 |
| E | 300 | 100 | 5.3 |

As shown in Table 2, the dryness of the cell (A) dried at a surface temperature of 70° C. is found inadequate. Although the drynesses of the cells (B, C, D, and E) dried at 150° C. to 300° C. are found adequate, deterioration of the load characteristics (short circuit current) is found with the cell (E) dried at 300° C. after the one-month storage period at 60° C.

This could be attributed for the decomposition of binder contained in the paint, and the degradation of adhesion of the conductive layer on the cell case caused by the excessively high surface temperature.

Therefore, the surface temperature of the cell case produced by the electromagnetic induction of the invention should be set within a range from 150° C. to 250° C.

Furthermore, the load characteristics of the cells measured right after the fabrication are found identical, and no differences are found in-between.

EXAMPLE-3

This is a case where the content of the mixed organic solvent contained in the paint used in Examples-1 and -2 is varied in a range between 90 to 70 wt %. The paint thus prepared accordingly is individually coated in the cell case, and dried by the electromagnetic induction heating, and the surface conditions are observed afterward.

During the experiments, the surface temperature is consistently set at 200° C. and the heating period at 10 seconds.

The cells are fabricated under a condition the same as the one used to prepare Examples -1 and -2, and the load characteristics of these are measured and tabulated in Table 3.

TABLE 3

| Cell type | Content of solvent in the paint (in wt %) | Observation of the coated paint | Mean short circuit after one month 60° C. storage (in ampere) |
|---|---|---|---|
| F | 90 | x trailing | 6.5 |
| G | 85 | o judged good | 7.5 |
| c | 80 | o judged good | 7.5 |
| H | 75 | o judged good | 7.6 |
| I | 70 | x nonuniformity | 7.5 |

As shown in Table 3, when the solvent content in the paint is increased up to 90 wt %, the viscosity of the paint is so lowered that the trailing of paint is invited. On the other hand, when the solvent content in the paint is lowered down to 70 wt %, the viscosity of the paint becomes so high that the uneven thickness of paint and thus, uneven conductive layer is produced.

Moreover, the load characteristics of the cells measured right after the fabrication are found identical over the all kinds of cells, but some extent of trailing of the paint is observed among the cells stored for one month at 60° C., and the deterioration of the load characteristics (lower short circuit current) is more pronounced with the cell (F) prepared by the paint of a solvent content of 90 wt %.

Judging from these results, the content of the dispersion medium including the solvent in the conductive paint within a range from 75 wt % to 85 wt % is considered appropriate.

From the explanation given in the above, it is understood that the variations in the load characteristics of alkaline-manganese cells can be minimized by coating a conductive paint on the area on which cathode molds make direct contact, and forming a uniform conductive layer within the cell-case by applying electromagnetic induction heating thereon of the invention which heats the cathode container itself evenly and quickly.

In the examples shown here, only a case where vinyl-chloride-vinyl acetate copolymer is employed as the binder of the conductive paint has been shown.

Furthermore, any kind of resin that is anti-alkaline, anti-oxidation, and formable into coating film can be employed instead of the above shown resin.

For example, any of the polymers solvable in the organic solvent, such as polyvinyl chloride, polyvinyl acetate, polystyrene, polyvinyl isobutyl ether, polymethyl penten, polyamide, polyethylene, or others can be employed.

In addition to the above, any of the aquatic suspensions of fluorocarbon resin represented by polytetrafluoroethylene (PTFE) and thermosetting resin such as epoxy resin or diallyl phthalate resin can be employed also.

When thermosetting resin is employed as a binder, and this is mixed with a carbon-system conductor such as graphite and carbon black and a curing agent, a product with a too high viscosity would be produced, but if this take place, the viscosity of the product may be adjusted by adding a small amount of solvent.

By applying electromagnetic induction heating onto the paint of such, evaporation of the solvent and curing of the binder which is thermosetting resin are simultaneously performed yielding a conductive coating film there.

Among many types of binder resin, polyvinyl chloride, polyvinyl acetate, vinyl chloride-vinyl acetate copolymer, polyethylene, epoxy resin are considered particularly advantageous from the aspect of cost.

Although discussions of these three samples are made only for the cylindrical alkaline-manganese cells, it is needless to mention that the above is applicable to the cells employing silver oxide, mercury oxide, or nickel oxihydroxide as the cathode material, and is effectively applicable to the button type cells.

What is claimed is:

1. A manufacturing process of alkaline cells in which cathode molds are closely contacted against an internal wall of a cathode container, comprising:
    coating a conductive paint containing a conductive material comprising a carbon-system on an area of the internal wall of said cathode container, on which the cathode molds are contacted, and
    heating said cathode container by applying electromagnetic induction-heating to perform at least drying of said paint and/or curing of said paint coating in order to form a conductive film on the internal wall of said cathode container.

2. A manufacturing process of alkaline cells according to claim 1, wherein the surface temperature of said cathode container is set at a temperature ranging from 150° C. to 250° C. by applying electromagnetic induction-heating.

3. A manufacturing process of alkaline cells according to claim 1, wherein anti-alkaline and anti-oxidation resin having a coating film forming capability is employed as a binder of said conductive paint.

4. A manufacturing process of alkaline cells according to claim 1, wherein a resin selected from the resin group including polyvinyl chloride, polyvinyl acetate, vinyl chloride-vinyl acetate copolymer, polyethylene, and epoxy resin is employed as a binder of said conductive paint.

5. A manufacturing process of alkaline cells according to claim 1, wherein the content of the dispersion medium in said conductive paint is in a range from 75 wt % to 85 wt %.

6. A manufacturing process of alkaline cells according to claim 5, wherein a hot wind heating method is employed in order to form said conductive coating layer on the area on which said cathode molds are closely contacted.

7. A manufacturing process of alkaline cells according to claim 6, wherein the electromagnetic induction heating and the hot wind heating methods are jointly employed in order to form said conductive coating layer on the area on which said cathode molds are closely contacted.

* * * * *